United States Patent
Alford

[11] 3,879,046
[45] Apr. 22, 1975

[54] ROTARY TOOL HOLDERS

[75] Inventor: Allen John Alford, Palmers Green, England

[73] Assignee: Babb Engineering Company, Hertfordshire, England

[22] Filed: Jan. 7, 1974

[21] Appl. No.: 431,362

[52] U.S. Cl. ............................... 279/48; 279/1 L
[51] Int. Cl. ............................................ B23b 5/22
[58] Field of Search .................. 279/49, 48, 54, 56; 408/239, 239 A, 240

[56] References Cited
UNITED STATES PATENTS
2,432,860   12/1947   Clatfelter ............................ 279/54
3,132,871   5/1964   Stewart ................................ 279/49

FOREIGN PATENTS OR APPLICATIONS
560,563   3/1944   United Kingdom .................. 279/49

Primary Examiner—Gil Weidenfeld
Assistant Examiner—W. R. Briggs
Attorney, Agent, or Firm—Friedman & Goodman

[57] ABSTRACT

A rotary tool holder of the type including a jaw-collet received within an axial recess of a body adapted for engagement with a rotary driving member, wherein the collet is formed with a flat laterally presented face and the body is formed with a bore which houses a driving pin projecting into said recess to engage the flat face of the collet drivingly in such a manner that the driving pin is stressed predominantly in compression rather than in shear.

9 Claims, 3 Drawing Figures

ROTARY TOOL HOLDERS

BACKGROUND OF THE INVENTION

1. Field of the Invention

This invention relates to rotary tool holders of the kind comprising a body adapted for engagement with a rotary driving member and including an axially directed recess extending from one end, hereinafter called "the forward end" of the body, a collet received within said recess and having a plurality of radially displaceable jaws adapted to grip a shank forming part of a rotary cutting tool, and a collet-tightening nut in screw-threaded engagement with said body and having operative engagement with said collet whereby rotation of said nut relative to said body causes the collet jaws to be displaced radially to tighten or loosen the grip of said jaws on said tool shank. Such rotary tool holders are hereinafter referred to as being of the kind specified.

2. Description Of The Prior Art

Previously, various arrangements have been adopted for establishing positive driving engagement between the body and the collet. For example, the inner end of the collet has been formed with an axially projecting spigot of non-round section which is received in an inner end part of the recess which is formed to complementary shape. This, however, requires a rather difficult and expensive operation in order to form the inner end of the recess to the desired shape.

Alternative proposals have utilised various forms of driving dogs secured to the body so as to extend into the recess and engage a corresponding groove or other like formation provided on the collet. However, such driving dogs are inevitably subjected to a high shearing force at the point where they project from the body into the recess and therefore they are prone to failure for this reason. In particular, U.S. Pat. No. 2,367,998 shows the use of a pin which extends radially through a side wall of the body of the holder and projects into the recess to be received within an axially extending slot formed in the external face of the collet. The force exerted on such pin in resisting rotary movement of the collet relative to the body will, it will be observed, tend to cause the pin to shear at the position where it protrudes from the body into the slot.

SUMMARY OF THE INVENTION

In accordance with the invention the collet of a rotary tool holder of the kind specified is formed with a flat laterally presented face, the body is formed with a bore intersecting said recess and a driving pin is housed in said bore, said driving pin having an end portion which projects into said recess and in use drivingly engages said flat face of the collet, and said pin extending at such an angle to said flat face that a line extending outwardly from the axis of rotation of the body in a plane perpendicular to said axis and normal to said flat face from any point of contact between said flat face and said pin extends into said bore and does not intersect said body at a point on the periphery of said recess.

The reaction exerted on the pin by the collet, when the holder is in use to rotate a cutting tool held by the collet, acts in such a direction, i.e. along the aforesaid line, that the pin is subjected to a predominantly compressive stress and not a predominantly shear stress as heretofore.

Preferably, the bore extends substantially radially relative to the axis of rotation and lies in a plane perpendicular to the latter, the end portion of the pin having a rounded end face which the flat face of the collet engages substantially tangentially in operation. The flat face of the collet may conveniently extend chordally and be formed by milling away or otherwise removing material from a circular section inner end portion of the collet.

The centre of curvature of the rounded end face of the pin may be disposed within the bore, and the rounded end face may thus be of less than hemispherical extent.

BRIEF DESCRIPTION OF THE DRAWINGS

The invention will now be described by way of example with reference to the accompanying drawings wherein.

DESCRIPTION OF THE PREFERRED EMBODIMENT

Figure 1:
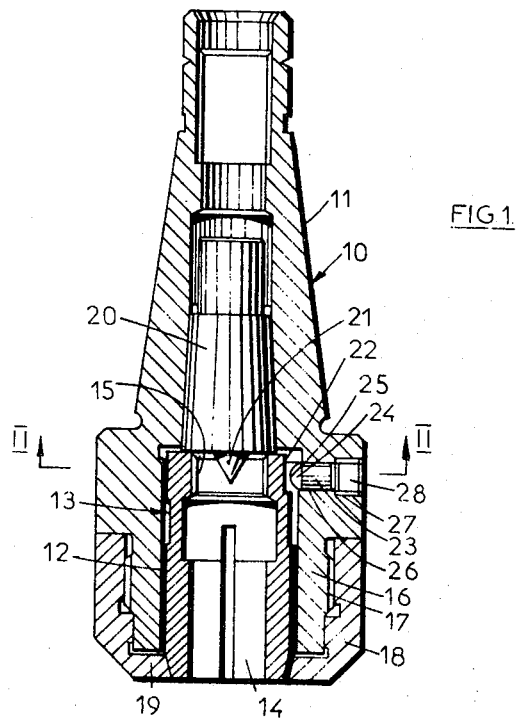
FIG. 1 shows a diametral section through one particular embodiment of collet chuck in accordance with the invention.
Figure 2:
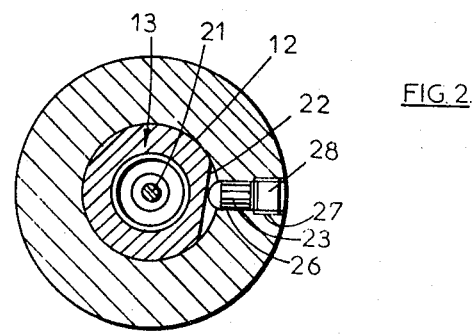
FIG. 2 shows a section on the line II—II of FIG. 1.

The collet chuck shown in FIG. 1 comprises a body 10 having a tapered shank portion 11 adapted for engagement in known manner within a conically tapered recess of a rotary driving member, such as a machine spindle or arbour. An axially directed recess 12 extends from the forward end of the body 10 and houses a collet 13 of the type including a plurality of radially displaceable jaws 14. At its inner end, the collet is internally threaded as indicated at 15 to receive the threaded end portion of a screwed shank cutter, or other rotary tool (not shown). A reduced diameter forward end portion 16 of the body 10 is formed with an external screw thread 17 on which is engaged an external nut 18 having a radially inwardly directed flange 19 which engages the forward ends of the collet jaws 14 in known manner such that rotation of the nut 18 displaces the collet jaws radially to tighten or loosen their grip on the shank of a tool held by the collet.

The shank 11 of the body 10 is itself recessed to receive a member 20 affording a centering point 21 to engage a complementary recess conventionally formed in the end face of the tool shank, so as to centre the latter.

In accordance with the invention the inner end of the collet 13 is of generally circular shape in section apart from a chordally arranged laterally presented flat face 22. This face is engaged by the rounded face 25 of a pin 23 accommodated within a generally radial bore 26 formed in the body, the pin 23 having an end portion 24 which projects into the recess 12. At its radially outer end, the bore 26 is counterbored as indicated at 27 and threadably receives a plug 28 therein.

Figure 3:
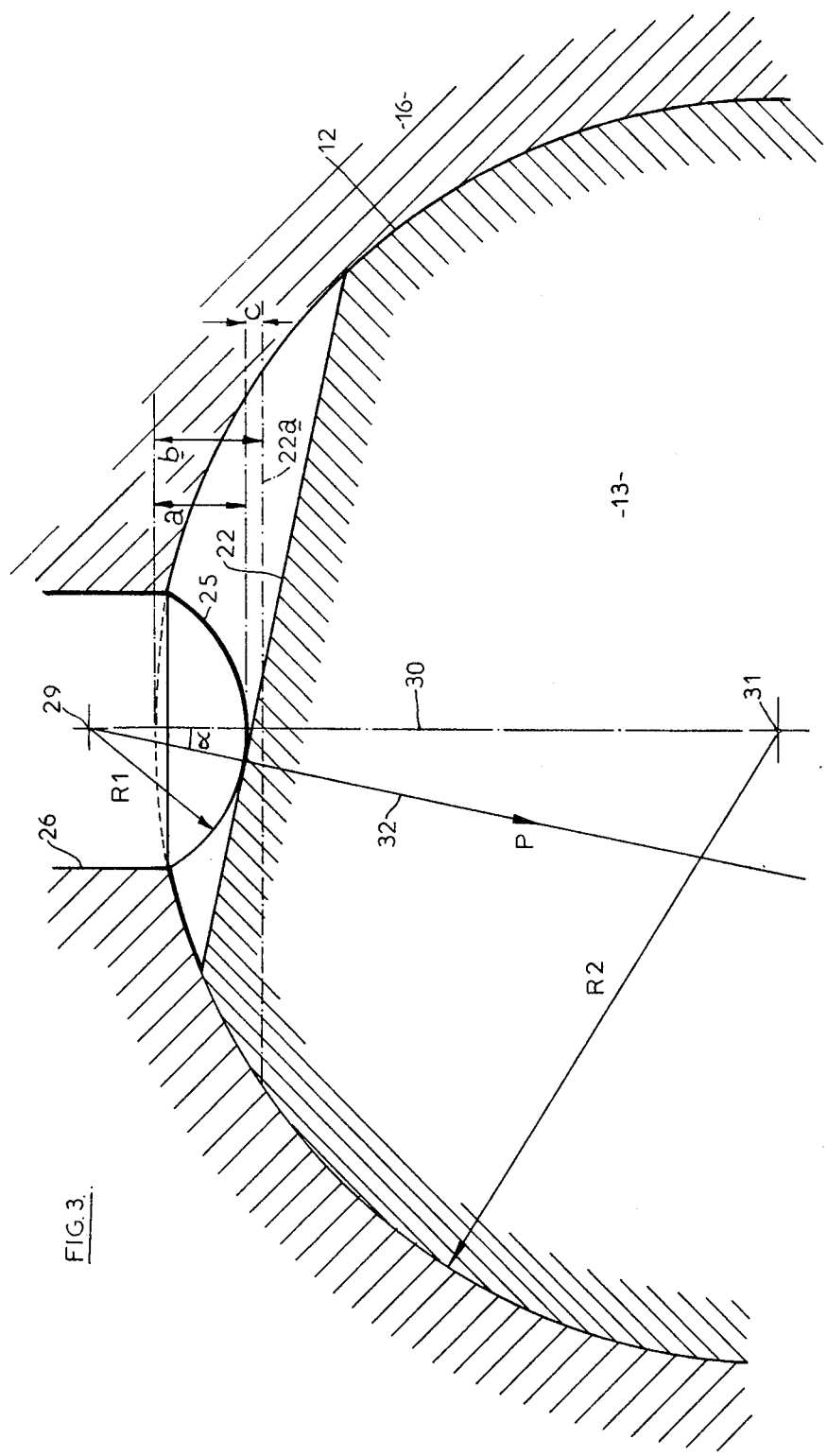
FIG. 3 is a diagram illustrating, in more detail, the manner in which a driving force is transmitted to the collet.

As can be seen more clearly from FIG. 3, the end face 25 of the pin 23 is of part-spherical form with its centre of curvature located within the bore 26. The flat face 22 is so arranged that when it extends perpendicular (as indicated at 22a) to a line 30 joining the centre of curvature 29 of the face 25 and the axis of rotation 31 of the body, there is a clearance $c$ between the faces 22 and 25. However, on rotation of the collet relative to the body, about the axis 31, to the working position in which the face 22 engages the face 25 tangentially, a line 32 normal to the face 22 at its point of contact with the face 25 extends at an angle $\alpha$ to the line 30. The line 32 represents the line of action of the driving force transmitted from the pin to the collet. It will at once be evident that the reaction exerted on the pin operates in the opposite direction to the driving force P and that the line of such reaction extends into the bore 26 and does not intersect the peripheral wall of the recess 12 in such a way as to give rise to a shear stress being exerted on the pin.

It will be understood that the collet 13 is free to rotate about the axis 31 relative to the body 10 between two extreme positions which are determined by contact between the flat face 22 and the curved face 25. At the moment of contact, there is no relative motion between the pin and the collet in the direction of line 32 and it therefore follows that there will be no tangential friction force. For this reason the driving force P must be transmitted from the pin to the collet in the direction of the line 32.

In the particular example illustrated in FIG. 3, the radius, R1, of the curved end face 25 of the pin is taken as 0.109 inch, and the radius, R2, of the recess 12 is taken as 0.4375 inch. The dimension $a$, that is to say the extent to which the end portion of the pin projects into the recess, is taken as being between 0.063 inch and 0.065 inch. The dimension $b$, that is the radial distance between the mid-point of the flat face 22 and the wall of the recess 12, is taken as being between 0.073 inch and 0.075 inch. Thus, the dimension $c$, that is the clearance between the end face of the p n and the flat face of the collet when the latter is in the position shown at 22a, lies between 0.008 inch and 0.012.

With these values, the angle $\alpha$ lies between $10° 28'$ and $12° 48'$. Assuming an average value for the angle $\alpha$, the line of action 32 of the force P acts at a radius of 0.0973 inch from the axis 31 of rotation of the collet. Hence, the driving torque is 0.0973 P.1bf. in, where P is the magnitude of the force exerted by the pin in 1bf. The thrust in the direction of the longitudinal axis of the pin 23 is P $\cos\alpha$ = 9795 P, using the mean value of $\alpha$. The force exerted by the wall of the bore 26 on the pin 23 therein is P $\sin\alpha$ = 0.2017 P. Thus, the driving force is supplied mainly by direct thrust on the pin through the retaining plug 28.

The pin is therefore loaded predominantly compressively and if made of a suitably hard material, such as hardened steel, will have a prolonged effective working life.

To minimise shear stress on the pin 23, the angle $\alpha$ should be kept as small as possible commensurate with the establishment of a sufficiently high driving torque. From the point of view of ease of manufacture and maintenance of satisfactory working tolerances, the bore 26 is preferably arranged radially relative to the axis of rotation 31. However, it would be possible for the bore 26 to be displaced laterally to some extent from the position shown to the extent that the line 32 forms an in-line extension of the axis of the pin.

I claim:

1. In a rotary tool holder of the kind specified comprising:

a. a body adapted for engagement with a rotary driving member and including an axially directed recess extending from a forward end of the body,
    b. a collet received within said recess and having a plurality of radially displaceable jaws adapted to grip a shank-forming part of a rotary cutting tool, and
    c. a collet-tightening nut in screw-threaded engagement with said body and having operative engagement with said collet, said nut and collet having means whereby rotation of said nut relative to said body causes the collet jaws to be displaced radially to tighten or loosen the grip of said jaws on said tool shank, the improvement comprising:
    d. a flat laterally presented face formed on said collet,
    e. a bore formed in said body and intersecting said recess, and
    f. a driving pin housed in said bore and having an end portion which projects into said recess and in use drivingly engages said flat face of the collet, said pin having a longitudinal axis extending at such an angle to said flat face that a line extending outwardly from the interior of the recess of said body in a plane perpendicular to the axis of said body and normal to said flat face from any point of contact between said flat face and said pin extends into said bore and does not intersect said body at a point on the periphery of said recess.

2. A rotary tool holder as claimed in claim 1 wherein said bore extends substantially radially relative to the axis of rotation of said body.

3. A rotary tool holder as claimed in claim 2 wherein said bore lies in a plane perpendicular to the axis of rotation of said body.

4. A rotary tool holder as claimed in claim 1 wherein the end portion of said pin is formed with a rounded end face which the flat face of the collet engages substantially tangentially in operation.

5. A rotary tool holder as claimed in claim 4 wherein said rounded end face of the pin has a centre of curvature which is disposed within said bore, the rounded end face thus being less than hemispherical in extent.

6. A rotary tool holder as claimed in claim 1 wherein said flat face of the collet extends chordally.

7. A rotary tool holder as claimed in claim 1 wherein the end portion of said pin has a rounded end face and the flat face of said collet extends chordally, the distance by which the end portion of said pin projects into said recess being less than the radial spacing between the mid-point of said flat face and the periphery of said recess so that when said flat face extends perpendicular to the longitudinal axis of said pin there is a clearance between the rounded end face of the pin and the flat face of the collet, the collet being rotatable relative to the pin into an operative position in which the end face of said pin engages the flat face of said collet drivingly.

8. A rotary tool holder as claimed in claim 1 wherein said bore extends from said recess to an outer surface of said body and at its outer end a plug is threadedly engaged therein to hold said pin against radially outward movement.

9. A rotary tool holder according to claim 8 wherein said line intersects said plug.

* * * * *

UNITED STATES PATENT OFFICE
CERTIFICATE OF CORRECTION

Patent No. 3,879,046                     Dated April 22, 1975

Inventor(s) Allen John Alford

It is certified that error appears in the above-identified patent and that said Letters Patent are hereby corrected as shown below:

On the cover sheet [73] Assignee: "Babb Engineering Company" should read -- Babb Engineering Company Limited --.

Signed and Sealed this twenty-first Day of October 1975

[SEAL]

Attest:

RUTH C. MASON
Attesting Officer

C. MARSHALL DANN
Commissioner of Patents and Trademarks